(12) United States Patent
Lupien et al.

(10) Patent No.: US 7,416,030 B2
(45) Date of Patent: Aug. 26, 2008

(54) ADJUSTABLE TIME DELAY FOR FIRE SUPPRESSION SYSTEM

(75) Inventors: Richard Lawrence Lupien, Grafton, MA (US); Peter Karalis, Watertown, MA (US)

(73) Assignee: Kidde Fenwal, Inc., Ashland, MA (US)

( * ) Notice: Subject to any disclaimer, the term of this patent is extended or adjusted under 35 U.S.C. 154(b) by 112 days.

(21) Appl. No.: 11/186,223

(22) Filed: Jul. 21, 2005

(65) Prior Publication Data

US 2007/0029097 A1    Feb. 8, 2007

(51) Int. Cl.
*A62C 37/10* (2006.01)

(52) U.S. Cl. .............. 169/60; 169/9; 169/19; 169/70; 239/70; 137/102; 251/48

(58) Field of Classification Search ........ 169/5, 169/9, 11, 19, 56, 60, 70; 239/67, 70; 137/102; 251/14, 48, 62

See application file for complete search history.

(56) References Cited

U.S. PATENT DOCUMENTS

| | | | | |
|---|---|---|---|---|
| 2,537,009 A | * | 1/1951 | Allen et al. ............ | 169/9 |
| 2,663,153 A | | 12/1953 | Grant, Jr. | |
| 2,758,657 A | * | 8/1956 | Williamson et al. ...... | 169/9 |
| 2,865,592 A | * | 12/1958 | Schrank ............ | 251/48 |
| 3,052,304 A | | 9/1962 | Williamson et al. | |
| 3,343,558 A | | 9/1967 | De Vita | |
| 3,788,400 A | * | 1/1974 | Tufts ............ | 169/11 |
| 3,990,516 A | | 11/1976 | Christensen et al. | |
| 4,373,588 A | * | 2/1983 | White et al. ........ | 169/19 |
| 4,520,871 A | * | 6/1985 | Miller et al. ........ | 169/9 |

FOREIGN PATENT DOCUMENTS

GB    2 088 022 A    6/1982

* cited by examiner

*Primary Examiner*—Steven J Ganey
(74) *Attorney, Agent, or Firm*—Merchant & Gould P.C.

(57) ABSTRACT

A mechanical time delay apparatus for creating a time delay between a pneumatic inlet for connection to a source of pressurized gas and a pneumatic outlet includes a primary pneumatic flow path from the inlet to the outlet. A movable gate is associated with the primary pneumatic flow path and is movable between an open position and a closed position. The gate is urged by a biasing force to the closed position. In the closed position, the gate is disposed to block a flow of gas through the primary pneumatic flow path. In the open position, the gate permits such flow. The time delay apparatus further includes an accumulation chamber in communication with the gate for a gas pressure within the accumulation chamber to urge the gate against the biasing force to the open position when the gas pressure exceeds a threshold pressure. A secondary pneumatic flow path extends the inlet to the accumulation chamber. An adjustment mechanism is provided for adjusting an internal volume of the accumulation chamber to thereby adjust an amount of time required for a gas admitted to the accumulation chamber to exceed the threshold pressure. The apparatus may be used in a fire suppression system to impart a time delay between detection of a fire hazard and release of a fire suppressant.

6 Claims, 4 Drawing Sheets

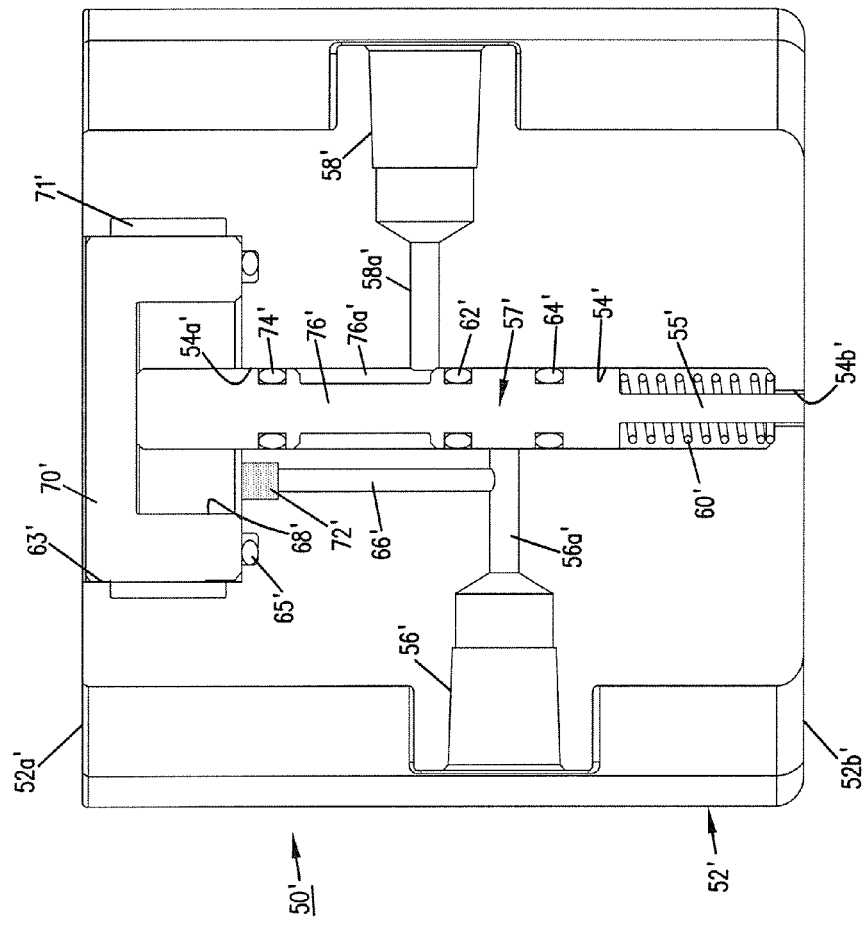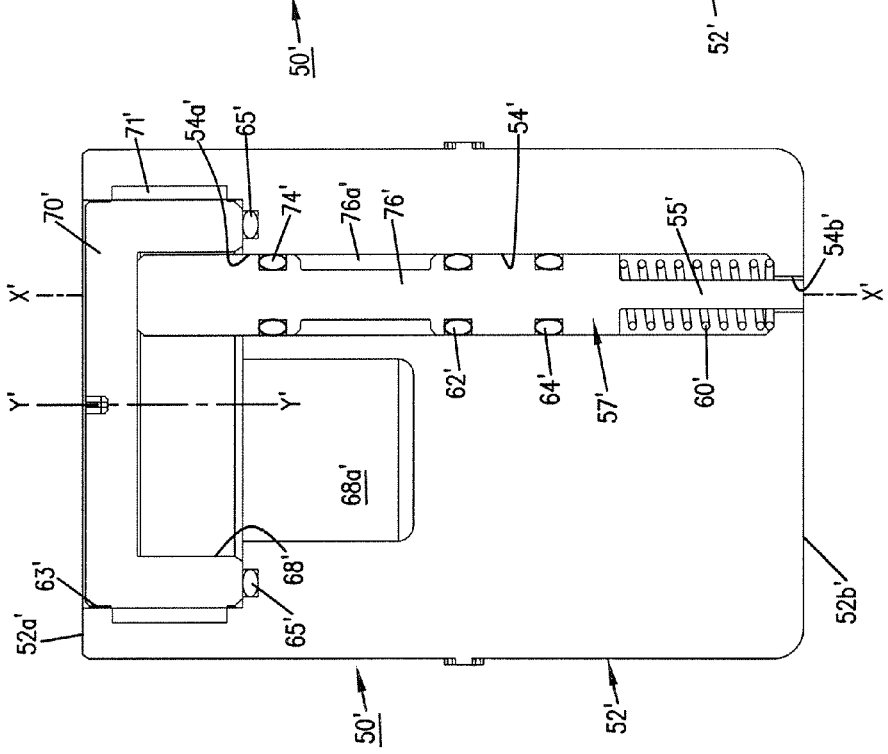

ADJUSTABLE TIME DELAY FOR FIRE SUPPRESSION SYSTEM

I. BACKGROUND OF THE INVENTION

1. Field of the Invention

This invention pertains to apparatus for delaying transmission of a pneumatic fluid. More particularly, this invention pertains to an apparatus for delaying a pneumatic actuation of a fire suppression system.

2. Description of the Prior Art

Fire suppression systems are used in a wide variety of applications. A common fire suppression system will include a fire suppressant and an actuator for activating delivery of the fire suppressant to a hazard site. For example, the fire suppressant may be contained within a pressurized container. The activation mechanism may include an activation head, which drives a valve coupled to the container for release of the fire suppressant upon actuation of the valve. The fire suppressant is delivered through tubing or the like to a nozzle, which is directed at a potential fire location. Fire suppression systems may be provided in buildings, transportation equipment such as vehicles, vessels or other installations where fire is a threat.

Not uncommonly, fire suppression systems may include automatic activation systems in the event of a detected fire. For example, buildings are commonly provided with automatic activation systems having a mechanical thermal sensor which degrades in response to heat. Such sensors may be a eutectic metal or thermal bulb technology, which degrades (such as melting or breaking) upon being exposed to a set temperature. In the event of such degradation of the element, the fire suppressant may be released through a nozzle.

Remote mechanical thermal detectors are known in the prior art. An example of a mechanical thermal detector utilizes a mechanical thermal sensor coupled to a control unit. The control unit may contain a source of a pressurized gas, which, upon detection of a fire by the mechanical thermal detector, releases the pressurized gas to an actuation head. The pressurized gas may be a small volume of pressurized nitrogen. The gas is released along a tubing to a pressure-activated actuation head coupled to the valve of a suppressant container. As an alternative to using a finite volume of a pressurized gas, the control unit may be connected to an unlimited source of a pressurized gas.

An example of a prior art system involving heat detectors, control units and pneumatic circuits for driving a pneumatically controlled actuator are described in "Kidde WHDR™ Wet Chemical Fire Suppression System, Addendum No. 6 to Installation, Operation and Maintenance Manual, Part No. 87-12200-001, UL EX 3559, Design and Installation Instructions for XV Control Systems", dated September 2002 and published by the assignee of the present invention.

In fire suppression systems, it is known to be desirable to provide a time delay between release of a pressurized gas by a control unit and actuation of the actuation head for releasing suppressant from the suppressant container.

There are several reasons that a time delay may be desired in a fire suppression system application. For reasons of safety, it may be important to delay to the release of a fire suppressant to allow a service technician or other occupant time to exit or perform some pertinent shutdown function. For example, once a fire is detected, it is common to a have a control system send a signal to operate a siren, horn or strobe light indicating a discharge of a fire suppressant is imminent. A time delay permits occupant egress or other preparations. Also, in the case of certain applications such as fire suppressant for spray booths or the like, a delay in the release of a fire suppressant permits an exhaust fan wind-down. In this example, it is important to delay the discharge of a dry chemical fire suppressant until the exhaust fans are stopped to maximize the effective discharge of the dry chemical.

FIG. 1 illustrates a prior art apparatus 10' which includes a fire suppressant container 12' and a pneumatically activated actuation head 14'. A remote thermal detector 20' is coupled to a control unit 30' by a cable 22'. A source 40' of pressurized gas (such as nitrogen) is connected to the controller 30' by a pneumatic conduit 42'. A pneumatic conduit 44' connects the control unit 30' to a time delay apparatus TDA. An outlet of the time delay apparatus TDA is connected by a pneumatic conduit 51' to the actuation head 14'. The actuation head 14' drives a valve (not shown) for release of suppressant from the container 12'. The suppressant flows through a tubing 15' to an outlet nozzle 16' located in the vicinity of a fire threat.

A prior art time delay apparatus TDA is illustrated in FIGS. 2 and 3 and is designated by numeral 50'. The prior art apparatus 50' includes a housing 52' formed of stock metal or the like which is machined or cast to form the various cavities and pathways that will be described herein. The housing 50' includes an upper end 52a' and a lower end 52b'.

At the upper end 52a', a threaded bore 63' is machined into the housing 52' with an axis Y'-Y' (FIG. 2) centrally positioned and extending between the ends 52a', 52b'. A hollow end cap 70' having external threads (schematically shown at 71') is threadedly received within the bore 63'. The interior of the end cap 70' defines an accumulation chamber 68'. An O-ring 65' seals the accumulation chamber 68' against the housing 52'.

An elongated chamber 54' is formed in the housing 50' with its axis X'-X' parallel to and offset from axis Y'-Y'. In the sectional view of FIG. 3, axis Y'-Y' is behind axis X'-X' and, therefore, not visible. An upper end 54a' of the chamber 54' communicates with the accumulation chamber 68'. A reduced diameter lower end 54b' extends through the housing lower end 52b'.

A spool 57' is positioned within the chamber 54' for movement along axis X'-X'. The spool 57' is machined in close tolerance to the chamber 54' except for a reduced diameter portion 76'. Opposing surfaces of the reduced diameter portion 76' and the chamber 54' define an annular chamber 76a' sealed by upper and lower O-rings 74', 62'. A reduced diameter pin 55' extends from the lower end of the spool 57' through the lower opening 54b'. The spool 57' moves along axis X'-X' from a blocking position (shown in FIG. 3) to an open position by movement of the spool 57' toward lower end 52b' and against the bias of a spring 60' surrounding pin 55'.

With reference to FIG. 3, the housing 52' has an inlet port 56' adapted to be connected to the pneumatic conduit 44' of FIG. 1. The housing 52' further includes an outlet port 58' for connection to the outlet pneumatic conduit 51' of FIG. 1.

The ports 56' and 58' are connected by a primary pneumatic path including a portion 56a' extending from inlet port 56' and a portion 58a' extending from outlet port 58'. Both the portions 56a' and 58a' communicate with the chamber 54' but are axially offset from one another as illustrated in FIG. 3.

When in the closed position of FIG. 3, the spool 57' is opposing the first pneumatic path portion 56a' with path portion 56a' is positioned between O-rings 62' and 64'. As a result, pressurized fluid within the first pneumatic path portion 56a' cannot urge the spool 57' to move against the bias of the spring 60'. In the open position, the spool 57' is moved against the bias of spring 60' (as will be described) to a position with both of the pneumatic path portions 56a', 58a' in communication with the annular chamber 76a'.

A secondary flow path 66' extends from the first pneumatic portion 56a' to the accumulation chamber 68'. A filter 72' (FIG. 3) associated with the secondary flow path 66' to impede the flow of gas into the accumulation chamber 68'.

The filter 72' is formed of sintered metal or sintered ceramic material. The porous nature of the filter 72' delays the flow of pressurized gas filling the accumulation chamber 68' thereby delaying the build-up of pressure against the upper O-ring 74'. After the occurrence of such delay, the pressure within the accumulation chamber 68' is sufficient to act against the O-ring 74' to urge the spool 57' against the bias of the spring 60' to the open position. In the open position, the annular chamber 76a' connects the first and second portions 56a', 58a' to open the primary pneumatic path between ports 56', 58'. This permits the flow of pressurized gas to the actuation head 14'.

As is known in the prior art, the amount of delay imparted by the delay apparatus 50' varies with the selection of the filter 72'. In a fire suppression system, a desired amount of delay may vary between ten to twenty seconds or more depending upon the particular application for use of the system 10'.

The design of the prior art mechanical delay 50' may also be varied to add additional delay by reason of adding an enlarged accumulation chamber cavity to add an additional time delay. Such a cavity 68a' is shown in FIG. 2 in fluid flow communication with the chamber 68' thereby increasing the volume of the accumulation chamber.

The volume of the chamber 68' may be determined at the time of the design of a particular delay apparatus to add or reduce the amount of delay by a desired amount. Further, the amount of delay can be varied by selecting the porosity of the filter. However, once the design of the filter has been selected and once the volume of chambers 68', 68a' has been selected, there is little opportunity to vary the time delay of a particular prior art apparatus 10'.

While prior art delay apparatus 10' is useful for adding a delay to a pneumatic system, certain features of such designs result in a lack of precise control of the amount of delay to be provided by a prior art apparatus 10'. For example, manufacturing tolerances of the sintered filter 72', the spring 60' as well as the dimensions for all internal chambers and pathways, O-rings and other components can result in variability of the individual actual delay times of manufactured prior art apparatus even though they are designed to have identical delay times. Also, an adjustable time delay results in a single design being suitable for a wider range of desired time delay applications.

It is an object of the present invention to provide a design permitting a more consistent and reliable delay time and which permits adjustment of a time delay.

II. SUMMARY OF THE INVENTION

According to a preferred embodiment of the present invention, a mechanical time delay apparatus is disclosed for creating a time delay between a pneumatic inlet for connection to a source of pressurized gas and a pneumatic outlet. The time delay apparatus includes a primary pneumatic flow path from the inlet to the outlet. A movable gate is associated with the primary pneumatic flow path and is movable between an open position and a closed position. The gate is urged by a biasing force to the closed position. In the closed position, the gate is disposed to block a flow of gas through the primary pneumatic flow path. In the open position, the gate permits such flow. The time delay apparatus further includes an accumulation chamber in communication with the gate for a gas pressure within the accumulation chamber to urge the gate against the biasing force to the open position when the gas pressure exceeds a threshold pressure. A secondary pneumatic flow path extends from the inlet to the accumulation chamber. An adjustment mechanism is provided for adjusting an internal volume of the accumulation chamber to thereby adjust an amount of time required for a gas admitted to the accumulation chamber to exceed the threshold pressure. The present invention further includes a fire suppression system including such a time delay apparatus.

III. BRIEF DESCRIPTION OF THE DRAWINGS

FIG. 2 is a side sectional view of a prior art time delay apparatus;

FIG. 3 is a side sectional view of the prior art time delay apparatus rotated 90 degrees relative to the view of FIG. 2;

IV. DETAILED DESCRIPTION OF THE PREFERRED EMBODIMENT

With reference now to the various drawing figures in which identical elements are numbered identically throughout, a description of the preferred embodiment of the present invention will now be provided. In a preferred embodiment, the present invention is provided to activate a fire suppression system. However, it will be appreciated that the present invention is applicable to a wide variety of applications including vehicles, buildings or other structures. The delay apparatus 50 of the present invention is, in a preferred embodiment, a time delay apparatus TDA in the fire suppression system 10 of FIG. 1.

Figure 1:
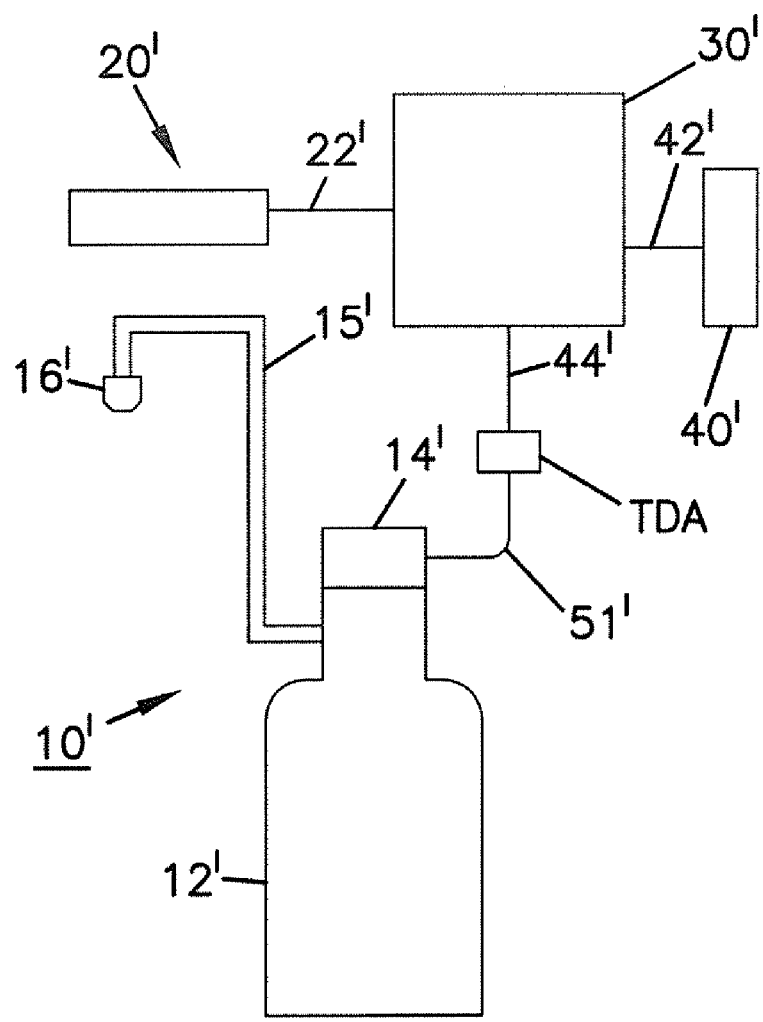
FIG. 1 is a schematic representation of a fire suppression system having a time delay apparatus.

The views of FIGS. 1 through 3 have already been described with FIGS. 2 and 3 being an illustration of a prior art time delay apparatus. Elements of the present invention in common with elements of the prior art are similarly numbered with the removal of an apostrophe to distinguish different embodiments. The foregoing description of the prior art is incorporated herein by reference.

Similar to the prior art apparatus 50', the apparatus 50 (illustrated in FIGS. 4 and 5 and schematically in FIGS. 6 and 7) of the present invention includes a housing 52 having an upper and lower ends 52a, 52b. A hollow end cap 70 is threaded into the bore 63 by threads schematically shown at 71.

The cap 70 defines an accumulation chamber 68. An O-ring 65 seals the accumulation chamber 68 against the housing 52. The accumulation chamber 68 of the apparatus 50 is shown enlarged relative to the accumulation chamber 68' of the prior art device 50'. It will be appreciated the chamber 68 could be the same volume as chamber 68'.

As in the prior art apparatus 50', the improved time delay device 50 has a spool 57 is positioned within a chamber 54 for movement along axis X-X. An upper end 54a of the chamber 54 communicates with the accumulation chamber 68. A reduced diameter lower end 54b extends through the housing lower end 52b. A lower pin 55 of the spool 57 extends through the lower opening 54b. A spring 60 surrounding pin 55 creates a biasing force urging the spool 57 to move toward the upper end 52a of the housing 50.

As in the prior art, the housing 52 has an inlet port 56 and an outlet port adapted to be connected to the pneumatic conduits 44', 51' respectively, of FIG. 1. The ports 56 and 58 are connected by a primary pneumatic path including first and second portions 56a, 58a extending from ports 56, 58, respectively. The pneumatic path portions 56a, 58a are axially offset and communicate with the chamber 54.

Figure 4:
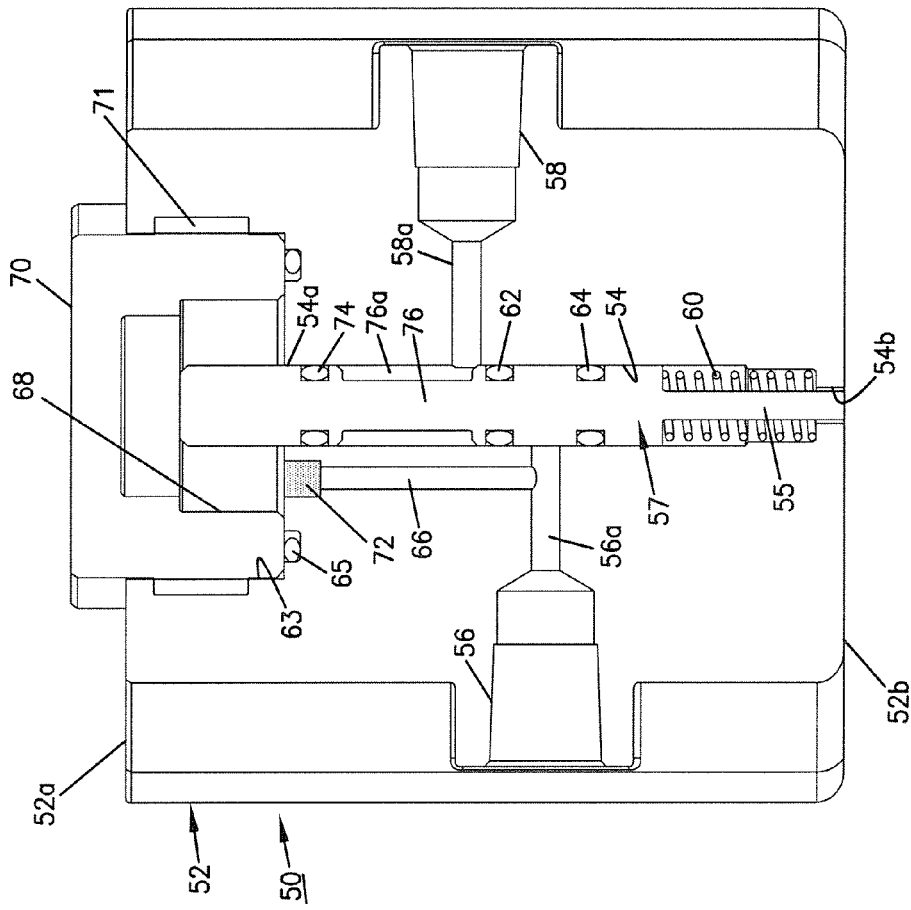
FIG. 4 is a view similar to FIG. 2 taken in section similar to FIG. 2 and showing a time delay apparatus according to the present invention.
Figure 5:
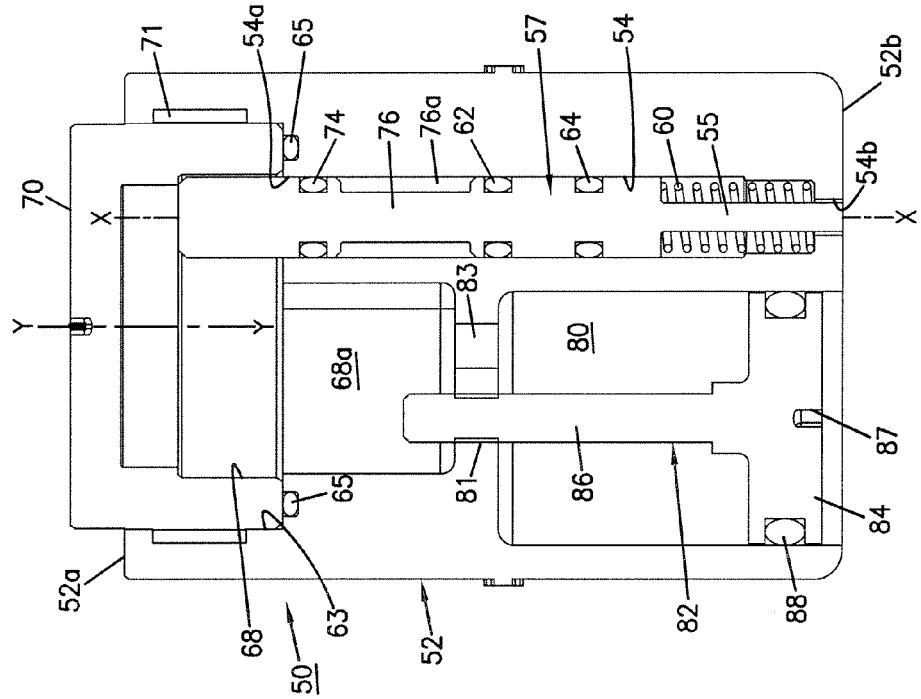
FIG. 5 is a view taken similar to FIG. 3 and showing a time delay apparatus according to the present invention.

When in the closed position of FIGS. 4 and 5, first pneumatic path portion 56a opposes the spool 57 and is sealed from an annular chamber 76a by O-rings 62 and 64. In the open position, the spool 57 is moved against the bias of spring 60 to a position with both of the pneumatic path portions 56a, 58a in communication with the annular chamber 76a.

A secondary flow path 66 (FIG. 5) extends from the first pneumatic portion 56a to the accumulation chamber 68. A filter 72 is associated with the secondary flow path 66 to impede flow of gas into the accumulation chamber 68. As in the prior art, the filter 72 is formed of sintered metal or sintered ceramic material and the porous nature of the filter 72 delays the flow of pressurized gas filling the accumulation chamber 68 thereby delaying the build-up of pressure against the upper O-ring 74.

After the occurrence of such delay, the pressure within the accumulation chamber 68 achieves a threshold pressure sufficient to act against the O-ring 74 to urge the spool 57 against the bias of the spring 60 to the open position. With the spool 57 in the open position, the annular chamber 76a connects the first and second portions 56a, 58a to open the primary pneumatic path between ports 56, 58. This permits the flow of pressurized gas to the actuation head 14.

It will be appreciated the description of the apparatus 50 thus described is the same in structure and function as that of the prior art apparatus 50'. Also, as in the prior art apparatus, the time delay apparatus 50 of the present invention may include an enlarged accumulation chamber 68a (FIG. 4) for adding volume to the accumulation chamber 68 and further adding to the time delay of the apparatus 50.

The time delay apparatus 50 of the present invention includes an improvement over the prior art for adjusting the amount of time delay of the apparatus 50 after manufacture.

Figure 6:
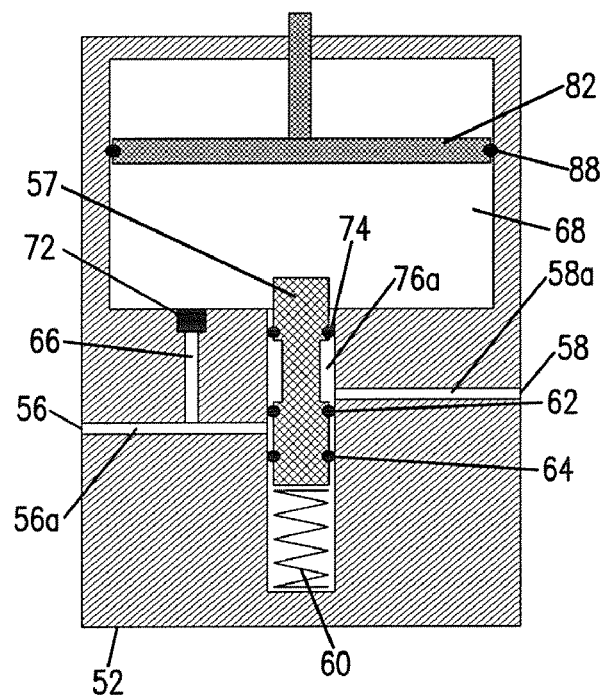
FIG. 6 is a schematic representation of a time delay apparatus of the present invention in a closed position.
Figure 7:
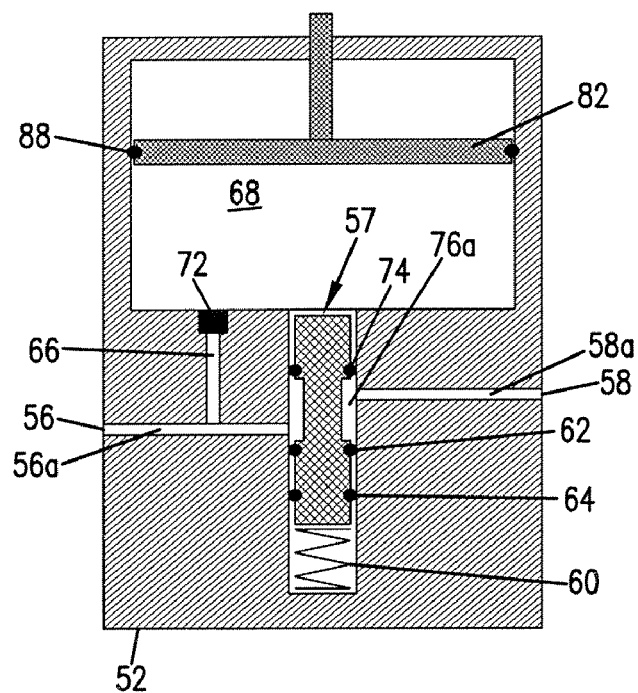
FIG. 7 is a schematic representation of a time delay apparatus of the present invention in an open position

As shown in FIG. 4, the apparatus 50 includes an enlarged chamber 80 connected by a conduit 83 to the accumulation chamber 68a and thereby in communication to the upper end of the spool 57. Since chamber 80 is directed connected to chambers 68, 68a, it is, effectively, an enlargement of the accumulation chamber 68 (as schematically illustrated in FIGS. 6 and 7).

A piston 82 is received within the chamber 80. The piston 82 has a piston head 84 threadedly engaging the walls of the chamber 80. As a result, the positioning of the piston 82 axially within the chamber 80 may be adjusted by turning a screwdriver or the like into a notch 87 formed in an exterior surface of the piston head 84.

A shaft 86 of the piston 82 extends through the chamber 80 (and through bore 81 in the housing 52 and into chamber 68a) to guide positioning and alignment of the piston 82 Within the chamber 80. The piston head 84 is sealed against the housing 52 by an O-ring 88.

In design for a particular application, the chambers 68, 68a and 80 are selected to have a combined volume, which together with the selection of the sintered filter 72, imparts a nominal or expected time delay to the device 50. In calculating the volumes 68, 68a and 80, the calculation of the volume of the chamber 80 may be made assuming positioning of the piston head 54 within an intermediate position (for example midway) within the chamber 80.

After manufacture of the device 50, the actual time delay of the apparatus 50 may be measured by noting a time delay between application of a pressurized gas at inlet 56 and release of the pressurized gas through outlet 58. The actual time delay for a particular unit may be compared with its nominal time delay.

If further time delay is desired, the piston 82 may be threaded outwardly to enlarge the volume of the chamber 80 and add additional time delay. Alternatively, the piston 82 may be threaded further into the chamber 80 to reduce the volume of the chamber 80 and thereby reduce the amount of time delay of the apparatus 50.

As a result of the improvement of the present invention, time delay variability (which may occur during the manufacturing process) may be eliminated by post-manufacture adjustment of the positioning of the piston 82 within the chamber 80. While such adjustment can be made in the field, it is presently preferred that such adjustment be made as final steps in the manufacturing process. Following such adjustment, the lower end 52b of the housing 52 may be sealed or otherwise protected to ensure fixed positioning of the piston 82 within the chamber 80 following such adjustment.

It has been shown how the objects of the present invention have been attained in a preferred embodiment. Modifications and equivalents of the disclosed concepts are intended to be included within the scope of the claims, which are appended hereto.

We claim:

1. A mechanical time delay apparatus for creating a time delay between a pneumatic inlet for connection to a source of pressurized gas and a pneumatic outlet, said time delay apparatus comprising:
   a primary pneumatic flow path from said inlet to said outlet;
   a movable gate associated with said primary pneumatic flow path and movable between an open position and a closed position, said gate urged by a biasing force to said closed position;
   in said closed position, said gate disposed to block a flow of gas through said primary pneumatic flow path, and, in said open position, said gate permitting said flow of gas through said primary flow path;
   an accumulation chamber in communication with said gate for a gas pressure within said accumulation chamber to urge said gate against said biasing force to said open position when said gas pressure exceeds a threshold pressure;
   a secondary pneumatic flow path from said inlet to said accumulation chamber;
   an adjustment mechanism for adjusting an internal volume of said accumulation chamber to thereby adjust an amount of time required for a gas admitted to said accumulation chamber to exceed said threshold pressure; and
   wherein said internal volume is defined, at least in part, by a movable wall, said adjustment mechanism includes said wall adapted to be moved to one of a plurality of stationary positions to alter said internal volume.

2. An apparatus according to claim 1 wherein said accumulation chamber and said primary and secondary pneumatic paths are defined by opposing surfaces of a housing, said movable wall threadedly engaging said housing to be moved between said plurality of positions upon rotating said wall.

3. An apparatus according to claim 2 wherein said wall is a piston head of a piston disposed within said internal volume.

4. A fire suppression apparatus comprising:
- a container of a fire suppressant;
- an actuation head for releasing said fire suppressant from said container in response to receipt of a pressured gas at said actuation head;
- a thermal detector for detecting an elevated temperature;
- a controller responsive to said thermal detector for releasing a pressurized gas;
- a time delay apparatus for creating a time delay between said release of said pressurized gas from said controller and said receipt of said pressurized gas by said actuation head, said time delay apparatus including
  - a pneumatic inlet connected to said by an inlet conduit to said controller;
  - a pneumatic outlet connected by an outlet conduit to said actuation head;
  - a primary pneumatic flow path from said inlet to said outlet;
  - a movable gate associated with said primary pneumatic flow path and movable between an open position and a closed position, said gate urged by a biasing force to said closed position;
  - in said closed position, said gate disposed to block a flow of gas through said primary pneumatic flow path, and, in said open position, said gate permitting said flow of gas through said primary flow path;
  - an accumulation chamber in communication with said gate for a gas pressure within said accumulation chamber to urge said gate against said biasing force to said open position after said gas pressure exceeds a threshold pressure, said accumulation chamber creating an imparted delay to said gas achieving said threshold pressure;
  - an adjustment mechanism for adjusting said imparted delay;
  - a secondary pneumatic flow path from said inlet to said accumulation chamber;
  - an adjustment mechanism for adjusting an internal volume of said accumulation chamber to thereby adjust an amount of time required for a gas admitted to said accumulation chamber to exceed said threshold pressure;
  - wherein said internal volume is defined, at least in part, by a movable wall, said adjustment mechanism includes said wall adapted to be moved to one of a plurality of stationary positions to alter said internal volume.

5. An apparatus according to claim 4 wherein said accumulation chamber and said primary and secondary pneumatic paths are defined by opposing surfaces of a housing, said movable wall threadedly engaging said housing to be moved between said plurality of positions upon rotating said wall.

6. An apparatus according to claim 5 wherein said wall is a piston head of a piston disposed within said internal volume.

* * * * *